Sept. 8, 1936.  E. E. GOEHRING ET AL  2,053,521
PUMPING EQUIPMENT
Filed Dec. 15, 1933  5 Sheets-Sheet 4
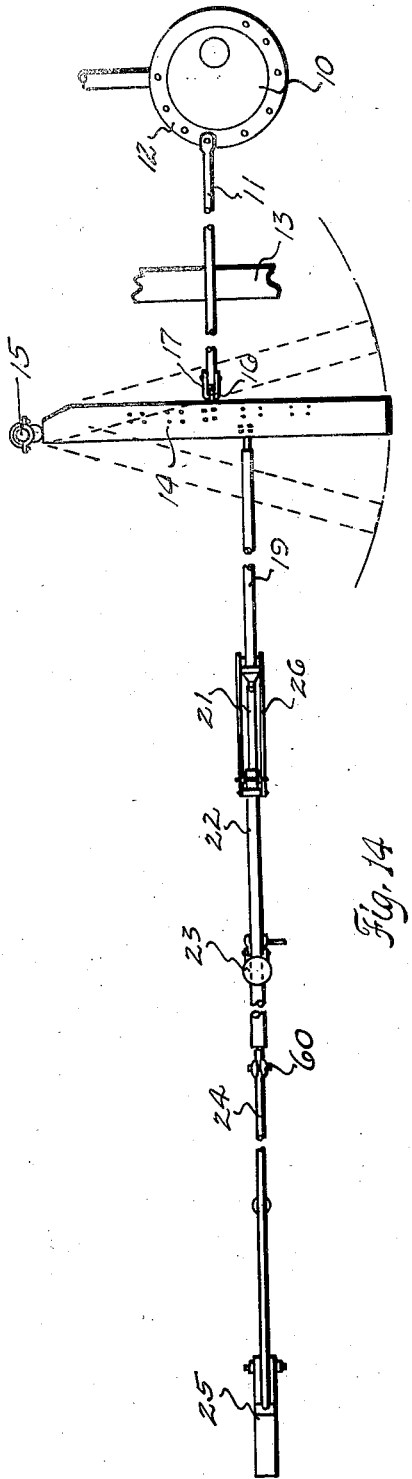
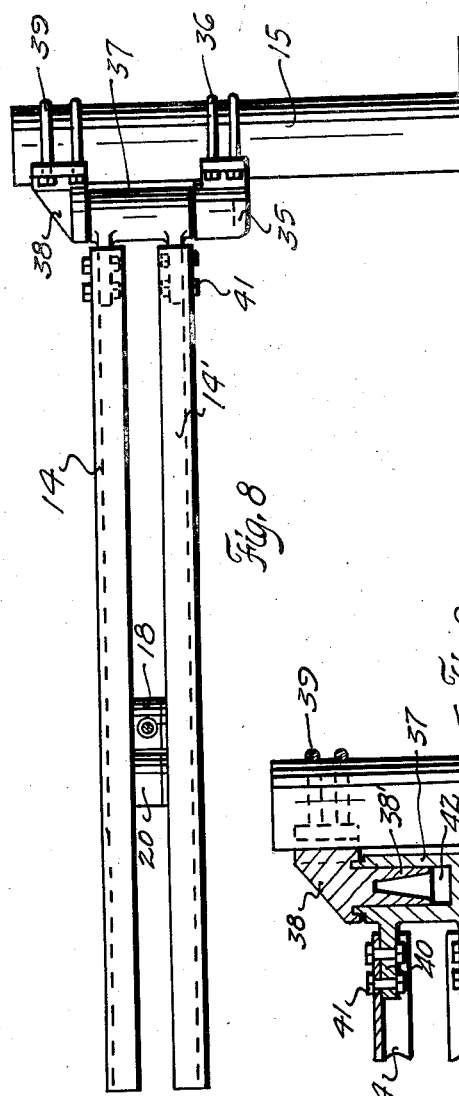
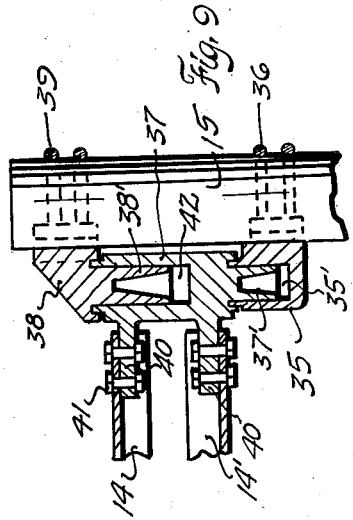
Inventors
Edwards E. Goehring
Fred H. Barney
William J. Gourley
By Jack A. Athley
Attorney

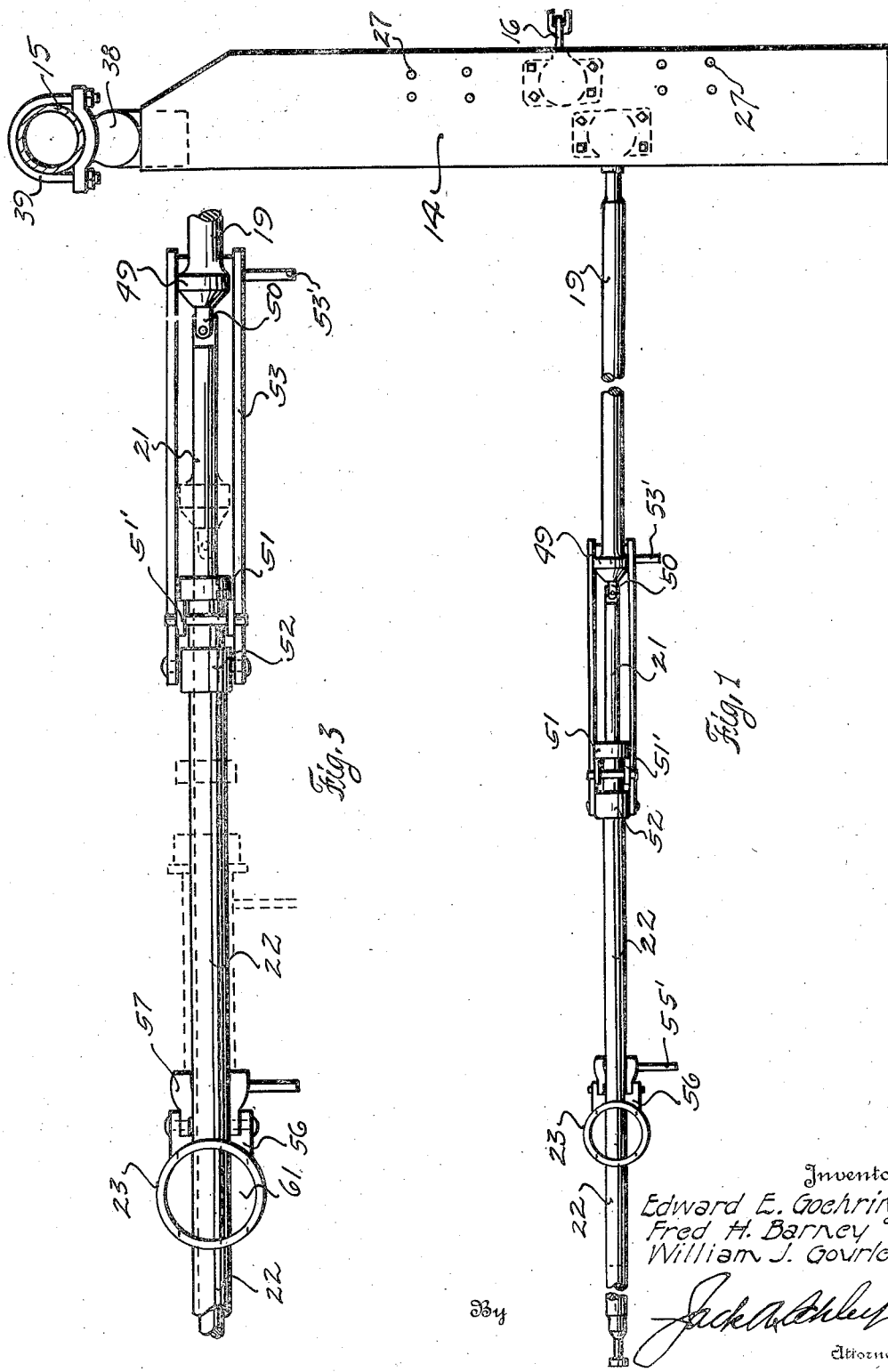

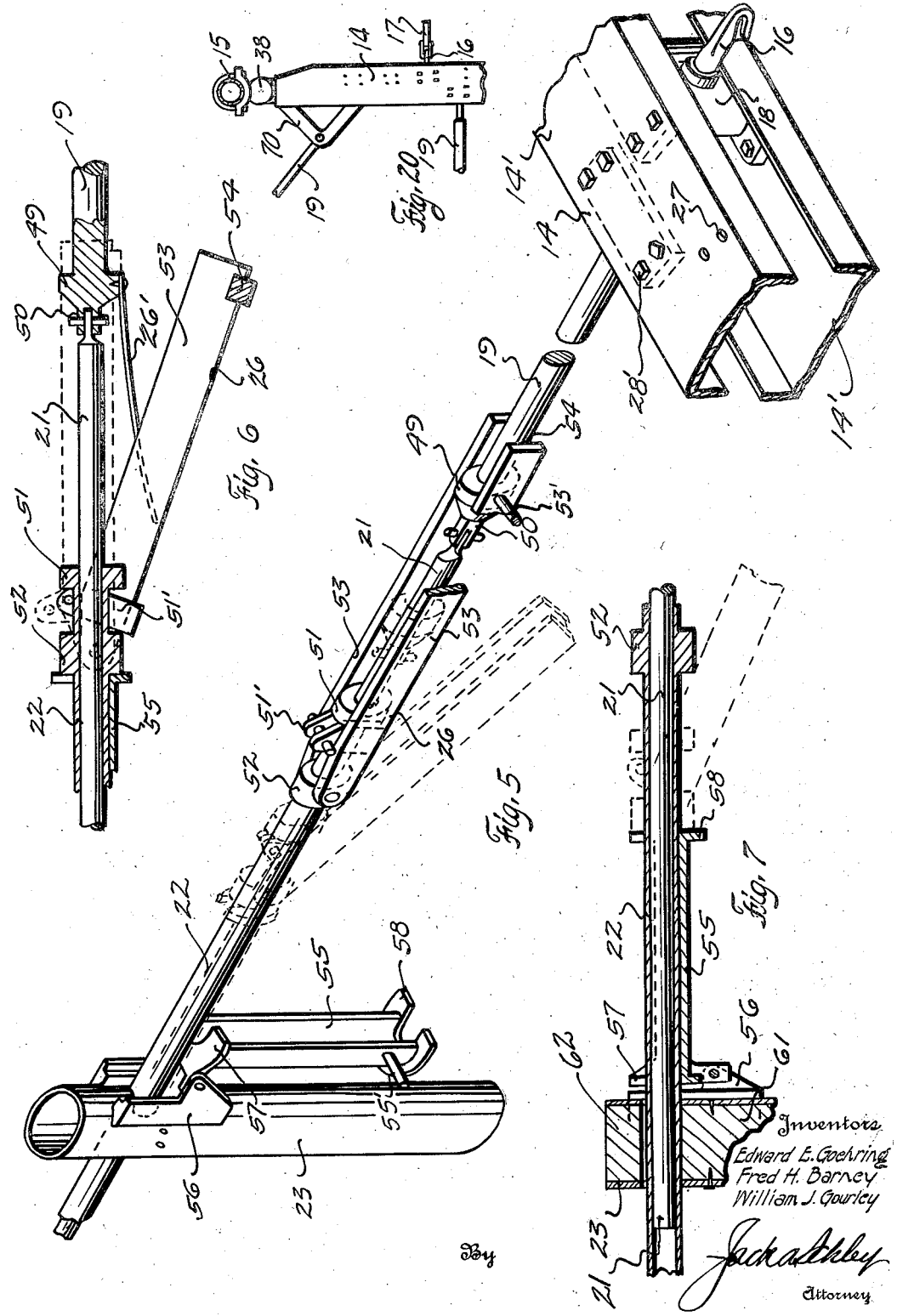

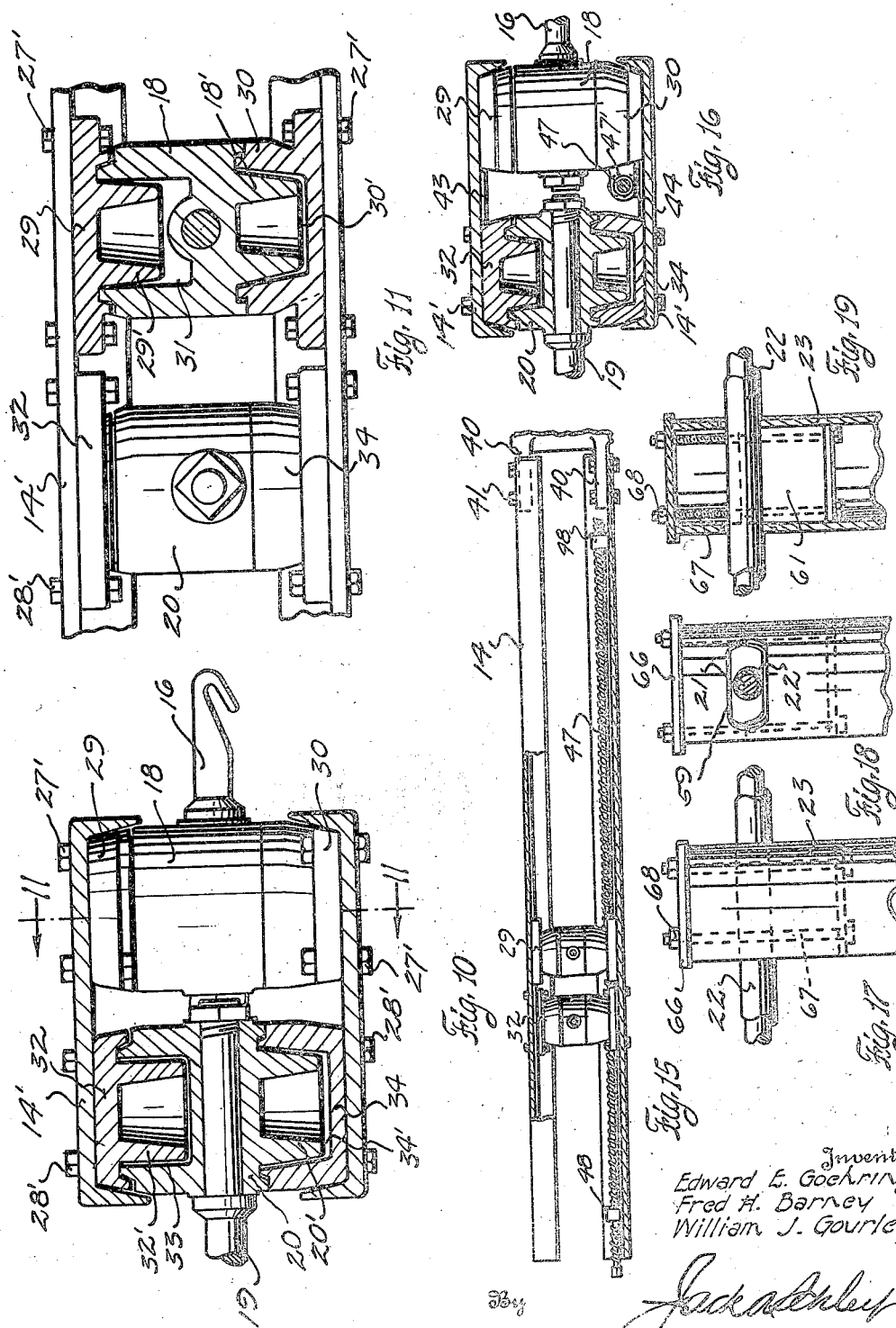

Patented Sept. 8, 1936

2,053,521

UNITED STATES PATENT OFFICE 2,053,521

PUMPING EQUIPMENT

Edward E. Goehring, Henderson, and Fred H. Barney and William J. Gourley, Fort Worth, Tex.

Application December 15, 1933, Serial No. 702,548

10 Claims. (Cl. 74—593)

This invention relates to new and useful improvements in pumping equipment.

One object of the invention is to provide improved pumping equipment, whereby motion may be transmitted to a pump jack or the transmission of such motion interrupted, in a more efficient and safe manner.

Another object of the invention is to provide a pumping equipment for transmitting motion from a pumping power to a rod line in an improved manner, whereby rod-line vibration is reduced to a minimum and transmission ratios may be set up for controlling the length of the stroke or travel of the rod line.

A particular object of the invention is to provide a coupling mechanism, commonly referred to in the oil fields as a "knock off", whereby the rod line may be connected with or disconnected from the pumping power in a safe manner and the use of hand operated links and other dangerous tools eliminated.

Still another object of the invention is to provide a pumping equipment in which an improved swing is employed, together with an improved bearing for supporting said swing arranged to insure constant lubrication and to withstand heavy loads, as well as being more or less dirt and water proof.

A further object if the invention is to provide a pumping equipment for use with a pumping power and a pumping jack constructed so as to be very flexible in its adaption to various pumping conditions, to be simple and compact in construction and in which the parts will be accessible, sturdy and readily adjusted.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a plan view of a pumping equipment constructed in accordance with the invention and showing the mechanism coupled.

Figure 2 is a side elevation of the same.

Figure 3 is an enlarged plan view of the coupling mechanism, showing the mechanism coupled in full lines and uncoupled in dotted lines.

Figure 4 is a side elevation of the same.

Figure 5 is a perspective view of the parts shown in Figures 1 and 2, illustrating the coupled position in full lines and the uncoupled position in dotted lines.

Figure 6 is a longitudinal sectional view of the coupler.

Figure 7 is a longitudinal sectional view of the uncoupled mechanism.

Figure 8 is a side elevation of the same.

Figure 9 is a vertical sectional view of the swing bearing and support.

Figures 10 and 11 are details of the transmission bearing members.

Figure 12 is a detail of the block adjustment.

Figure 13 is a vertical sectional view of the same.

Figure 14 is a plan view (details being omitted) showing the equipment connected with a pumping power and a pump jack.

Figure 15 is a view partly in elevation and partly in section showing a modified form of swing beam.

Figure 16 is an enlarged horizontal cross sectional view of the same.

Figure 17 is an elevation of a knock off post equipped with another form of block adjustment.

Figure 18 is an elevation at right angles to Figure 17.

Figure 19 is a vertical sectional view of the same, and

Figure 20 is a plan view showing the swing beam equipped with a bracket for pumping an additional well.

In the drawings the numeral 10 designates a pumping power (Figure 14) which may be of any suitable type, and 11 the pitman pivoted to the eccentric ring 12 of said power. It is customary to provide a shelf or rail 13 on which the pitman may bear when it is disconnected from the swing. I have shown a swing beam 14 mounted upon a post 15 and provided with a hook 16 (Figures 1, 5, 10 and 14) for engaging in a loop 17 on the outer end of the pitman.

The hook 16 is attached to a bearing collar 18 journaled in the beam 14 (Figures 2 and 11). A connecting rod 19 is pivoted to a bearing collar also journaled in the beam 14. This rod is pivoted at its opposite end to a plunger 21 telescoping a sleeve 22 sliding through a knock-off post 23 and clamped to the rod line 24. The rod line is connected to the usual pump jack 25 (Figure 14). The pump rods in the well exert a pull on the rod line which is applied to the parts attached thereto and transmitted back to the power 10. A coupler 26 carried by the sleeve 22 may be engaged with the connecting rod 19 as is shown in full lines in Figures 1 to 5 and 14, whereby the pull exerted by the power 10 will be transmitted to said sleeve and the rod line connected thereto. When the coupler is disengaged as is shown in full lines in Figure 6, the plunger 21 will be free to slide in the sleeve so that motion will not be transmitted thereto from the pumping power. The details of the various parts will be hereinafter described.

The swing beam 14 (Figures 1, 2, 5, 8, 10, and 11) is preferably formed of top and bottom channels 14', inverted with their flanges opposed and spaced apart. These channels are provided with bolt holes 27 and 28. A bearing cap 29 and a bearing step 30 are secured between the channels by bolts 27' passing through holes 27. The collar 18 (Figure 11) has a central well 31 receiving a pivot stud 29' depending from the cap. A stud 18' depends from the collar into a well 30' in the step. The studs are hollow and the wells co-acting therewith will hold ample quantities of lubricant. Any suitable means for supplying lubricant to these wells may be provided. By removing the bolts 27' and sliding the cap and step longitudinally of the beam the amplitude of the swing of the beam 14, may vary, as is obvious.

A cap 32 and a step 34 are secured in the channels by bolts 28' passing through the holes 28, which are on the opposite side of the beam from the holes 27. The cap 32 has a hollow stud 32 (Figure 10) depending into a well 33 formed in the top of the collar 20; while said collar has a hollow stud 20' depending into a well 34' in the step 34.

The collars 18 and 20 have flanged bearing contacts with their caps and steps, which may be suitably packed, whereby escape of the lubricant is reduced to a minimum. These bearing contacts are large and the oil baths make for adequate lubrication and cool journals.

A bearing step 35 is fastened to the post 15 (Figures 8 and 9) by U-bolts 36. A hub 37 is journaled between the step 35 and a cap 38 held on the post by U-bolts 39. The hub has brackets 40 extending into the beam and fastened thereto by bolts 41. This bearing member is of the oil bath type and is similar to the collar bearings 18 and 20. The step has a well 35' receiving a hollow stud 37' depending from the hub. The upper end of the step fits in the bottom of the hub around said stud. The upper end of the hub engages in the bottom of the cap around a stud 38' extending down into a well 42 in said hub. These joints may be suitably packed and lubricating oil may be constantly fed to the wells 35' and 42. The bearing members are large and adequate to support the beam. Ball or roller bearings may be used if desired.

In Figures 15 and 16 another means for adjusting the collar bearing is shown. The cap 29 is arranged to slide longitudinally of the beam 14 on one side of a track 43; while the step 30 is mounted to slide on one side of a track 44. A bottom screw 47 is journaled in hangers 48 and threaded through an ear 47' on the adjacent side of the step 30. This screw has its head projecting from the outer end of the beam. By turning the screw 47 the collar 18 is adjusted longitudinally of the beam. Any other form of adjustment may be used.

The connecting rod 19 (Figures 10 and 11) is fastened in the collar 20 and is reduced for this purpose (Figures 1 and 2). On its opposite end the rod 19 has an annular head 49 (Figures 3, 5, and 6) pivotally connected to the reduced end of the plunger by a clevis 50. The sleeve 22 is formed with a collar 51 and a second collar 52, spaced inwardly from the first collar. The coupler 26 comprises a pair of side bars 53 pivoted to the collar 52 on each side of the sleeve and extending on each side of the plunger 21. A transverse keeper bar 54 connects the outer ends of the bars.

When the plunger is telescoped into the sleeve 22 the coupler 26 may be swung up to engage the keeper bar behind the head 49 as shown in dotted lines in Figure 6 and in full lines in Figures 1 to 5. The head is shouldered so that the keeper may firmly engage the same. The coupler is held until the shoulder of the head engages the keeper bar and the pull of the pumping power 10 is thus exerted on the sleeve, whereby motion is transmitted to the rod line 24 (Figure 14). To prevent an attempted coupling when the head 49 has not been moved toward the sleeve a sufficient distance to permit the keeper bar to be swung up against the rod 19 in the path of the head, a leaf spring 26' (Figure 6 only) may be fastened to the head so as to extend between the bars 53, but it is not a necessary element. The coupler may have a handle 53' for swinging it.

For supporting the coupler in its uncoupled position a beveled stirrup 51' (Figures 5 and 6) is fastened to the side bars 53 near their pivots, so as to engage the collar 51 (Figure 6) and limit the downward swing of said coupler.

For uncoupling or disconnecting the coupler 26 from the head 49 a knock off prop or member 55 is hinged to a hanger 56, welded or otherwise fastened to the side of the post 23 (Figures 1 to 5 and 6). The prop is trough shaped so that it may be swung up to receive the sleeve and a handle 55' is provided on it for this purpose. The prop has a yoke 57 at its inner end and a yoke 58 at its outer end and when swung up the yoke 57 bears against the hanger 56 (Figure 7) and the yoke 58 is in the path of the collar 52 (Figures 5 and 6). The operator must of course wait until the sleeve is being pulled by the beam 14 and is at the end of its pulled stroke, before swinging the prop upwardly.

When the sleeve is drawn back by the rod line the collar 52 will strike the yoke 58, whereby further return movement of the sleeve will be prevented. Upon the arrest of the sleeve the outward or return movement of the connecting rod 19 and the plunger 21, will continue, whereby the head 49 will move away from the bar 54, which is held stationary by the sleeve. As soon as the frictional engagement between the head and the bar is broken, the coupler 26 will swing downward. This will permit the swing to operate and the plunger to reciprocate in the sleeve. Whenever the coupler 26 is swung up into position and the sleeve 22 thus moved the collar 52 will be withdrawn from the yoke 58, whereby the prop will swing downward and release said sleeve.

In handling the prop the operator uses the handle 55' and thus does not bring his hand into a dangerous position. Many workmen lose fingers and hands because of injuries in connecting and knocking off rod lines. The workman may grasp either side bar 53 of the coupler 26 and safely swing the same to coupling position, but it is more safe to use the handle 53'.

The sleeve slides through a transverse slot 59 in the post 23 and is connected to the rod line 24 by a clamp 60 (Figure 14). In order to prevent the sleeve dragging on the lower edges of the tubular metal post, a wooden wear block 61 is mounted in the post as is shown in Figures 12 and 13 for supporting said sleeve. A quantity of heavy grease is placed on top of this block to reduce wear and a plug 62 (Figure 7) may be inserted in the top of the post if desired. For holding the block in place large nails 63 may be driven through holes 64 in the sides of the post. When the block wears down, a pinch bar may be inserted in an opening 65 in the post below the block and after the heads of the nails have been knocked off, said nails may be driven into the blocks with a nail punch. By means of the pinch bar (not shown) the block 61 may be elevated and again nailed in place.

Another form of block adjustment is shown in Figures 17, 18 and 19. The post 23 is equipped with a cap plate 66. The block 61 is suspended by rods 67 extending through the plate. Nuts 68 on the upper ends of the rods bear against the top of the plate. By adjusting these nuts the rods and block may be drawn up to compensate the wear on the block. Any other means of taking up the wear may be used.

When the parts are connected as shown in full lines in Figures 1 to 5 and 14 motion will be transmitted to the pump jack when the swing beam is swung to the right (Figure 14) by the pitman 11 of the pumping power 10. This will pull the rod line 24 and elevate the pump rods (not shown) whereby the well will be pumped; the stroke being referred to as the pull or left stroke. Upon the reverse movement of the pitman, the weight of the pump rods will exert a pull on the rod line, whereby all connections will remain under tension as the beam is swung to the left (Figure 14). This stroke is referred to as the return or push stroke as the rod line is moved away from the swing and the pump rods are lowered in the well.

Because of the bearing adjustment on the beam 14, whereby the collar 18 may be shifted to amplify or reduce the swing of said beam and the travel of the connecting rod and the rod line which is coupled thereto, a number of operations may be carried out. When the standing valves become clogged with sand, the stroke can be lengthened to strike the valves together and jar loose the sand, or the top of a corroded working barrel may be cleaned by changing the stroke. The swing may be worked at an angle and more than one well can be operated thereby. Because of the easy swing a smaller rod line may be employed. Two wells may be pumped by the same swing, one with a long stroke and the other with a short stroke. The beam 14 may be mounted high above the ground or close to it, as the case may be.

In Figure 20 a bracket 70 is shown fastened to the side of the beam 14. An additional connecting rod 19 is journaled in this bracket and thus two wells may be pumped with the same beam.

When the pumping is to be stopped the operator merely has to wait until the beam 14 swings to the right (Figure 14) to complete its pull stroke, and then by grasping the handle 55' (Figures 2, 5 and 14) he may safely swing the prop 55 up to engage the collar 52 and arrest the sleeve, whereby the coupler 26 will be released and swung down as is shown in Figure 6. The beam 14 may continue to swing and the plunger 21 will reciprocate in the sleeve; however, where the hook 16 is used the pitman 11 will push its loop 17 out of said hook, thus riding on the shelf 13 and saving the swing from unnecessary wear. When the equipment is again coupled the prop 55 swings safely out of the way and the workman is not subjected to any risks which might result in injury.

While connection to the pitman 11 has been shown by means of a hook 16 and a loop 17, whereby the parts are automatically disconnected, it is to be understood that any desirable connection between the pitman and the beam may be made and the automatic disconnecting feature may be eliminated.

It is pointed out that because of the proximity of the swing beam 14 to the pumping power 10, the amplitude of swing of said beam is not as great, for a given rod line stroke, as where the swing beam (usually vertical) is located at a considerable distance from the pumping power, which is the present oil field practice. By shortening the arc of the beam travel, lateral movement or side play in the post 23 is greatly reduced. This not only cuts down vibration and side whip, but reduces wear of the parts and makes for an easy operation. The beam may consist of a single beam or a plurality of beams.

The description which has been given, recites more or less detail of a particular embodiment of the invention, which is set forth as new and useful, however, we desire it understood that the invention is not limited to such exact details of construction, because it is manifest that changes and modifications may be made, within the scope of the appended claims, without departing from the spirit of the invention.

What we claim and desire to secure by Letters Patent, is:

1. A well pumping equipment comprising, an operating member, a connecting rod attached to said member, a plunger attached to said rod, a sliding sleeve in which said plunger reciprocates, a coupler carried by the sleeve for coupling the sleeve and rod, means for connecting said sleeve to a rod line, a knock-off post slidably supporting said sleeve, and means carried by the post for disconnecting said coupler.

2. A pumping equipment comprising, a connecting rod, a plunger attached to said rod, a sleeve in which the rod reciprocates, a head on the rod, a coupler pivoted on the sleeve for engaging the head, and means for limiting the swing of the coupler when it is disconnected from the head.

3. A pumping equipment comprising, a connecting rod, a plunger attached to said rod, a sleeve in which the rod reciprocates, a head on the rod, a coupler pivoted on the sleeve for engaging the head, means for limiting the swing of the coupler when it is disconnected from the head, a post for slidably supporting the sleeve, and a prop hinged to the post for engaging the sleeve to disconnect the coupler.

4. A pumping equipment comprising, a sleeve having a collar, a coupler hinged to the sleeve collar, a plunger reciprocating in the sleeve, an operating connection having a head attached to the plunger, means on the coupler for engaging said head when said coupler is swung to the plunger, means carried by the coupler and the sleeve for limiting the swing of the coupler when the latter is swung away from the plunger.

5. A well pumping equipment comprising, a connecting rod for attachment to a pumping power, a pump rod line, a sleeve connected with the rod line, a plunger telescoping the sleeve and attached to the connecting rod, a hinged coupler pivoted on the sleeve, and having means for engaging the connecting rod for coupling the sleeve thereto and arranged to be moved out of said engagement to permit the plunger to reciprocate in the sleeve.

6. A well pumping equipment comprising, a connecting rod for attachment to a pumping power, a pump rod line, a sleeve connected with the rod line, a plunger telescoping the sleeve and attached to the connecting rod, a hinged coupler pivoted on the sleeve and having means for engaging the connecting rod for coupling the sleeve thereto and arranged to be moved out of said engagement to permit the plunger to reciprocate in the sleeve, a post for guiding the sleeve, a prop hinged to the post, and means on the sleeve for engaging the prop.

7. A well pumping equipment including, a connecting rod, a pump rod line, a telescoping connection providing a sliding connection between the connecting rod and the rod line, a single longitudinally swinging coupler hinged at one end to the connection for holding said connection against telescoping, adapted to hang free when uncoupled and to be swung upward with one hand to coupling position, and means for holding said connection to afford telescoping when the coupler is hanging free.

8. A well pumping equipment including, a connecting rod, a pump rod line, a telescoping connection providing a sliding connection between the connecting rod and the rod line, a single longitudinally swinging coupler hinged at one end to the connection for holding said connection against telescoping adapted to hang free when uncoupled and to be swung upward with one hand to coupling position, a guide for the telescoping connection, and a prop coacting with said connection for causing telescoping when the coupler is disconnected.

9. A pumping equipment including, a reciprocating member having connections for attachment with a pumping power and a rod line, an upright post for slidably supporting said member, a hanger mounted on said post, and a prop hinged at one end to said hanger and located entirely below said member, said hanger being adapted to be manually swung longitudinally and upwardly to engage said member from the underside and hold it against reciprocation.

10. A pumping equipment including, a reciprocating member having connections for attachment with a pumping power and a rod line, an upright post for slidably supporting said member, a hanger mounted on said post, a trough-shaped prop hinged to said hanger at one end and located entirely below the reciprocating member, the prop having a yoke at its outer end, and means for manually swinging said prop longitudinally and upwardly to a horizontal position to receive said member and to engage said yoke with the member to hold it against reciprocation.

WILLIAM J. GOURLEY.
FRED H. BARNEY.
EDWARD E. GOEHRING.